United States Patent [19]
Gnauert

[11] Patent Number: 5,329,967
[45] Date of Patent: Jul. 19, 1994

[54] LEVER ASSEMBLY FOR SINGLE-CONTROL MIXING VALVE

[75] Inventor: Werner Gnauert, Iserlohn, Fed. Rep. of Germany

[73] Assignee: Friedrich Grohe Aktiengesellschaft, Hemer, Fed. Rep. of Germany

[21] Appl. No.: 91,239

[22] Filed: Jul. 13, 1993

[30] Foreign Application Priority Data

Jul. 14, 1992 [DE] Fed. Rep. of Germany ....... 4223093

[51] Int. Cl.⁵ .......................................... F16K 11/078
[52] U.S. Cl. .............. 137/625.17; 137/625.4; 137/636.3
[58] Field of Search ........... 137/625.17, 625.4, 625.41, 137/636.2, 636.3

[56] References Cited

U.S. PATENT DOCUMENTS

| | | | |
|---|---|---|---|
| 4,378,029 | 3/1983 | Parkison | 137/625.17 X |
| 4,449,551 | 5/1984 | Lorch | 137/625.4 X |
| 4,610,272 | 9/1986 | Gottwald et al. | 137/625.17 |
| 4,630,643 | 12/1986 | Lorch | 137/625.41 X |
| 4,651,774 | 3/1987 | Oberdorfer | 137/625.17 |
| 4,685,487 | 8/1987 | Derdack et al. | 137/625.4 X |
| 4,708,172 | 11/1987 | Riis | 137/625.17 |
| 4,960,154 | 10/1990 | Dagiantis | 137/625.17 |
| 5,082,023 | 1/1992 | D'Atayer de Costemore d'Arc | 137/625.17 X |
| 5,148,551 | 9/1992 | Humpert et al. | 137/625.17 X |

FOREIGN PATENT DOCUMENTS

| | | |
|---|---|---|
| 0092863 | 11/1983 | European Pat. Off. . |
| 2808349 | 9/1979 | Fed. Rep. of Germany ... 137/636.3 |
| 3426236 | 1/1986 | Fed. Rep. of Germany . |
| 3426236 | 1/1986 | Fed. Rep. of Germany . |
| 9017658.8 | 6/1991 | Fed. Rep. of Germany . |
| 4113878 | 11/1991 | Fed. Rep. of Germany . |

Primary Examiner—John Rivell
Attorney, Agent, or Firm—Herbert Dubno; Andrew Wilford

[57] ABSTRACT

A single-control mixing valve has an upwardly directed stem extending along a stem axis and movable relative to a normally stationary valve axis for regulation of flow through the valve. A lever assembly has a flange element having a socket fitted complimentarily over the stem and a plate having a periphery and extending transversely of the valve axis, a first screw secures the flange element to the stem with the socket fitted over same, and a lever having a cup-shaped base part formed with a downwardly open seat complimentarily fittable with the plate and an arm projecting laterally from the base part. The seat has a laterally open recess, and a second screw secures the plate in the seat with a portion of the seat periphery projecting laterally into the recess.

7 Claims, 2 Drawing Sheets 5,329,967

LEVER ASSEMBLY FOR SINGLE-CONTROL MIXING VALVE

FIELD OF THE INVENTION

The present invention relates to a single-control mixing valve. More particularly this invention concerns a lever assembly for such a valve.

BACKGROUND OF THE INVENTION

A standard single-control mixing valve has as described in German patent 3,426,236 of M. Pawelzik et al an upwardly directed stem extending along a stem axis and movable relative to a normally stationary valve axis for regulation of flow through the valve. This stem is controlled by a lever formed with a downwardly open socket that fits complimentarily over the stem so that tipping and pivoting the lever operates the valve. The lever is secured to the stem by a screw that passes through the lever and is threaded coaxially into the stem. A removable cap or cover disk on the lever hides this screw.

While this system is fairly simple and does provide a fairly solid connection between the lever and the valve stem, the cap covering the screw is often found to spoil the appearance of the lever. Furthermore if this cap is pried out and replaced, it is frequently marred somewhat, further ruining the appearance of the fixture.

It has been suggested in German utility model 9,01,658 published 20 June 1991 to simply make the lever a tight snap fit on the valve stem. This system is more attractive, but has been found to provide an insufficiently strong mounting, so that the lever can be knocked off accidentally.

OBJECTS OF THE INVENTION

It is therefore an object of the present invention to provide an improved lever assembly for a single-control mixing valve.

Another object is the provision of such an improved lever assembly for a single-control mixing valve which overcomes the above-given disadvantages, that is which is attractive but which nonetheless maintains a solid connection between the lever and the valve stem.

SUMMARY OF THE INVENTION

A single-control mixing valve has an upwardly directed stem extending along a stem axis and movable relative to a normally stationary valve axis for regulation of flow through the valve. A lever assembly has a flange element having a socket fitted complimentarily over the stem and a plate having a periphery and extending transversely of the valve axis, a first screw secures the flange element to the stem with the socket fitted over same, and a lever having a cup-shaped base part formed with a downwardly open seat complimentarily fittable with the plate and an arm projecting laterally from the base part. The seat has a laterally open recess, and a second screw secures the plate in the seat with a portion of the seat periphery projecting laterally into the recess.

Thus with this system the screw that holds the lever on the stem is not visible. The second screw can be hidden under the lever so that it is normally not seen also. The result is an extremely attractive assembly that nonetheless ensures very solid mounting of the lever on the valve stem.

According to another feature of the invention the second screw is threaded upwardly through the base part and engages upwardly and laterally against the plate in the seat to press the plate into the recess. The periphery is generally circularly and the recess receives between one-quarter and one-half of the periphery. The screw is diametrally opposite the recess relative to the valve axis. Furthermore the plate has an upper face engaged upward with the seat and the periphery is substantially circular, and the screw extends at an acute angle of about 45° to the plate. The lever is of metal and the screw is underneath the arm.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
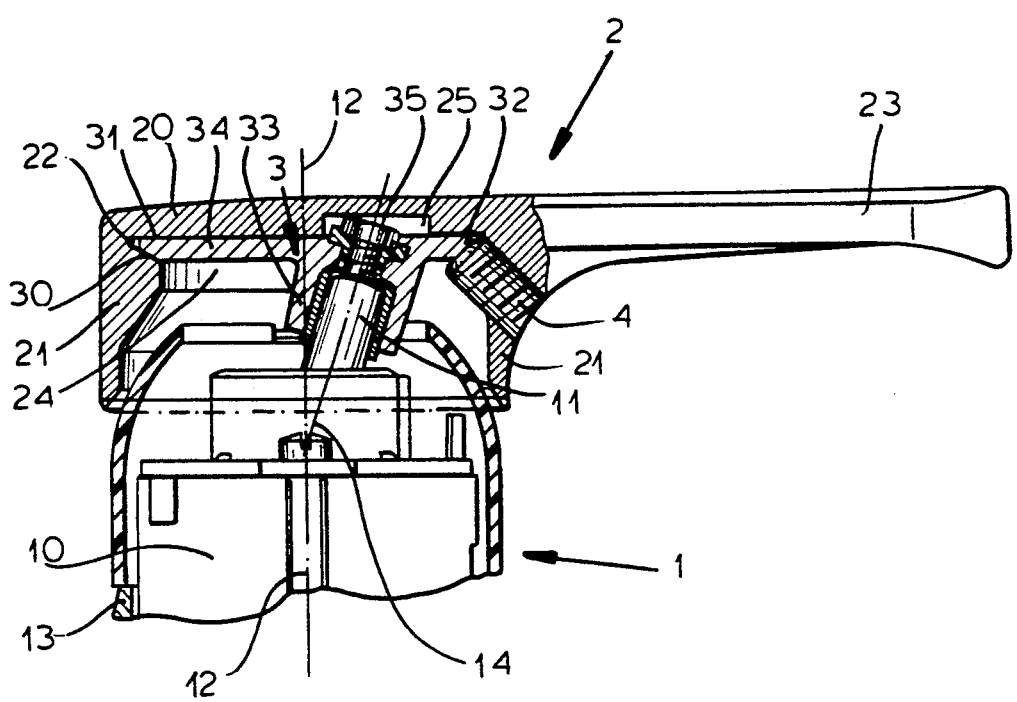
FIG. 1 is a vertical section through the valve and lever assembly according to the invention.
Figure 2:
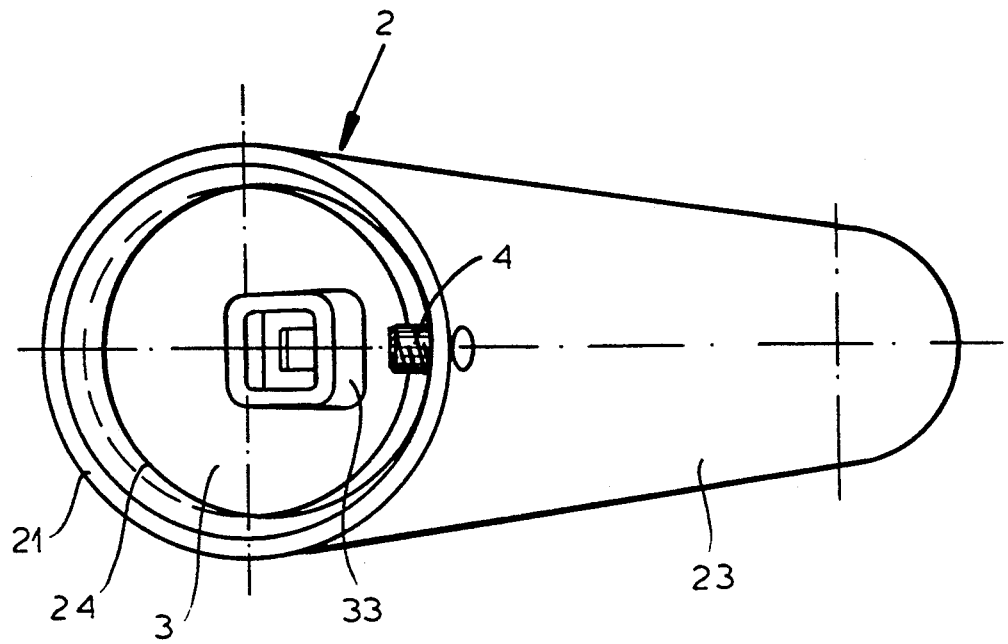
FIG. 2 is a bottom view of the lever assembly.
Figure 3:
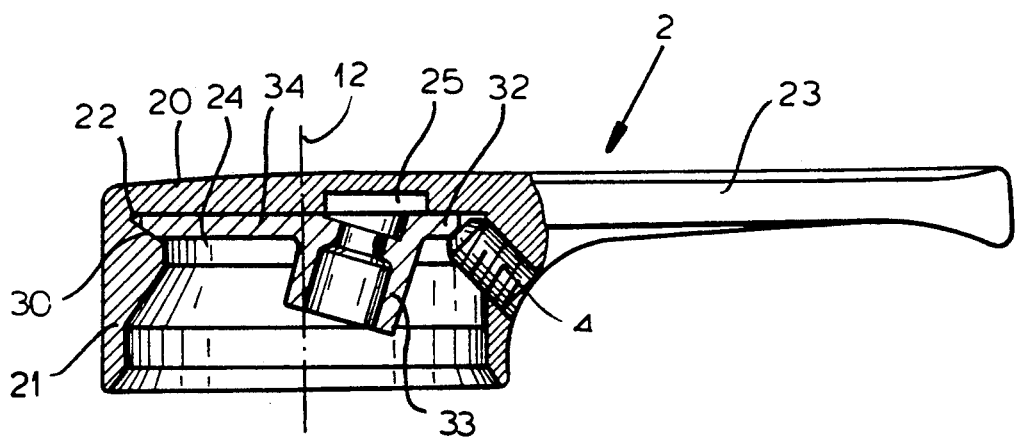
FIG. 3 is a vertical section through the lever assembly.

As seen in FIGS. 1 through 3 a standard mixing valve 1 has a cartridge 10 centered on a normally vertical axis 12 and provided with a square-section stem 11 extending along an axis 14 intersecting and normally forming a small acute angle with the axis 12. The cartridge 10 is contained within a decorative housing 13 of an otherwise unillustrated faucet assembly.

A lever assembly comprises a solid-metal lever 2, a mounting element 3, and a screw 4. The lever 2 comprises a downwardly open cup-shaped base part 20 having a cylindrical downwardly extending skirt 21 defining a downwardly open seat 24 and a normally horizontally extending handle or arm 23 that typically projects out toward the user of the fitting incorporating the valve cartridge 10. The seat 24 is undercut at its side opposite the handle 2 in the form of a radially inwardly open semicircular groove 22. As is usual, tipping the lever 2 up and down changes the volume of flow through the valve controlled by the cartridge 10, and pivoting it about the axis 12 changes the temperature of the flow.

The mounting element 3 has a circular disk 34 with a planar upper face 31 that normally fits flatly against the downwardly directed circularly planar floor of the seat 24 and a downwardly directed square-section tubular socket 33 that fits complimentarily over the upper end of the stem 11. A screw 35 engages through the element 2 and into the stem 11 to fix the part 3 on the stem 11. The rear edge of the element 3 is beveled at 30 to fit in the seat groove 22 and the front part of the element 3 is angled off at 32 where it is engaged by the end of the screw 4 that extends at 45° to the axis 12. The groove 22 forms a 45° angle that complimentarily engages over the beveled edge 30. A recess 25 in the floor of the seat 25 accommodates the head of the screw 35 although it is possible to recess this head 35 in the top surface 31 of the disk 34 and thereby eliminate the need for this recess 25.

The above-described assembly is put together by first fitting the element 3 over the stem 11 and securing it in place with the screw 35. Then the seat 24 of the part 2 is fitted over the disk 34 and the rear edge 30 is fitted into the seat 22 by sliding the part 2 forward. The screw 4 is then tightened to force the disk 34 tightly back into the seat 22 and press the front edge up against the floor of the seat 24.

In the finished assembly the top of the lever 2 will be completely uninterrupted. The screw 4 will be hidden from view under normal circumstances, while still being readily accessible for removal of this lever 2 if necessary.

I claim:

1. In combination with a single-control mixing valve having an upwardly directed stem extending along a stem axis and movable relative to a normally stationary valve axis for regulation of flow through the valve, a lever assembly comprising:
 a flange element having a socket fitted complimentarily over the stem and a plate having a periphery and extending transversely of the valve axis;
 means for securing the flange element to the stem with the socket fitted over same;
 a lever having a cup-shaped base part formed with a downwardly open seat complimentarily fittable with the plate and an arm projecting laterally from the base part, the seat having a laterally open recess; and
 means for securing the plate in the seat with a portion of the seat periphery projecting laterally into the recess.

2. The lever assembly defined in claim 1 wherein the means for securing the plate in the seat includes a screw threaded upwardly through the base part and engaging upwardly and laterally against the plate in the seat to press the plate into the recess.

3. The lever assembly defined in claim 2 wherein the periphery is generally circularly and the recess receives between one-quarter and one-half of the periphery, the screw being diametrally opposite the recess relative to the valve axis.

4. The lever assembly defined in claim 3 wherein the plate has an upper face engaged upward with the seat, the periphery is substantially circular, and the screw extends at an acute angle of about 45° to the plate.

5. The lever assembly defined in claim 2 wherein the lever is of metal.

6. The lever assembly defined in claim 2 wherein the screw is underneath the arm.

7. In combination with a single-control mixing valve having an upwardly directed stem extending along a stem axis and movable relative to a normally stationary valve axis for regulation of flow through the valve, a lever assembly comprising:
 a flange element having a socket fitted complimentarily over the stem and a flat plate having a substantially circular periphery and extending transversely of the valve axis;
 a first screw securing the flange element to the stem with the socket fitted over same;
 a lever having a cup-shaped base part formed with a downwardly open generally cylindrical seat complimentarily fittable with the plate and an arm projecting laterally from the base part, the seat having a laterally open groove recess; and
 a second screw threaded through the base part and engaging the plate for securing the plate in the seat and pressing a portion of the seat laterally into the recess.

* * * * *